(12) United States Patent
Gavlik

(10) Patent No.: US 6,745,325 B1
(45) Date of Patent: Jun. 1, 2004

(54) SERIAL INTERFACE FOR REPROGRAMMING MULTIPLE NETWORK INTERFACE CARDS AND METHOD OF OPERATION

(75) Inventor: John E. Gavlik, Oxnard, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 624 days.

(21) Appl. No.: 09/713,542

(22) Filed: Nov. 15, 2000

(51) Int. Cl.[7] ............................ G06F 1/24; G06F 15/177
(52) U.S. Cl. ............................ 713/100; 713/1; 709/221
(58) Field of Search ...................... 713/100, 1; 709/221, 709/242, 220; 714/4

(56) References Cited

U.S. PATENT DOCUMENTS

| | | | | |
|---|---|---|---|---|
| 5,465,106 A | * | 11/1995 | Keech et al. | 345/204 |
| 6,286,070 B1 | * | 9/2001 | Ohara | 710/113 |
| 6,363,423 B1 | * | 3/2002 | Chiles et al. | 709/224 |
| 6,496,858 B1 | * | 12/2002 | Frailong et al. | 709/221 |
| 6,523,083 B1 | * | 2/2003 | Lin et al. | 711/103 |
| 6,535,924 B1 | * | 3/2003 | Kwok et al. | 709/242 |

FOREIGN PATENT DOCUMENTS

JP 11143703 A * 5/1999 ............. G06F/9/06

OTHER PUBLICATIONS

IBM, Microcontroller Instruction Execute Diagnostic Procedure, Jul. 1, 1976, IBM Technical Disclosure Bulletin, vol 19, Issue 2, pp. 649–650.*

* cited by examiner

*Primary Examiner*—Dennis M. Butler
*Assistant Examiner*—Suresh K Suryawanshi

(57) ABSTRACT

There is disclosed, for use in a communication device comprising a plurality of network interface cards for communicating with an external data network, an apparatus for simultaneously transferring a replacement program into a plurality of dedicated memories in the plurality of network interface cards. The apparatus comprises: 1) a replacement program memory for storing the replacement program; 2) a first microcontroller coupled to the replacement program memory and having a first dedicated memory associated therewith; and 3) a second microcontroller coupled to the replacement program memory and having a second dedicated memory associated therewith. After a power reset has occurred, the first microcontroller monitors a first signal line to the replacement program memory to determine if the second microcontroller is transferring the replacement program from the replacement program memory to the second dedicated memory and wherein the first microcontroller, in response to a determination that the second microcontroller is transferring the replacement program, transfers at least a portion of the replacement program to the first dedicated memory as the replacement program is read from the replacement program memory by the second microcontroller.

20 Claims, 3 Drawing Sheets

SERIAL INTERFACE FOR REPROGRAMMING MULTIPLE NETWORK INTERFACE CARDS AND METHOD OF OPERATION

CROSS-REFERENCE TO RELATED APPLICATIONS

The present invention is related to those disclosed in the following U.S. patent applications:

1. Ser. No. 09/713,389, entitled "Network Interface Card Using Physical Layer Microcontroller and Method of Operation" and filed concurrently herewith; and
2. Ser. No. 09/713,643, entitled "Multitasking Microcontroller for Controlling the Physical Layer of a Network Interface Card and Method of Operation" and filed concurrently herewith.

The above applications are commonly assigned to the assignee of the present invention. The disclosures of these related patent applications are hereby incorporated by reference into the present disclosure as if fully set forth herein.

TECHNICAL FIELD OF THE INVENTION

The present invention is generally directed to network interface cards and, more specifically, to a circuit for simultaneously reprogramming microcontrollers in multiple network interface cards.

BACKGROUND OF THE INVENTION

The demand for high-performance computers and communication devices requires that state-of-the-art networks and network interface devices operate at comparable high-performance levels. The necessary high-performance is provided by network interface cards (NIC) that operate at ever increasing speeds. These network interface cards (NIC) are used in a wide variety of devices, including personal computers, switches, routers, hubs, bridges, and the like. Network interface cards operating at 10 Mbps (i.e., 10BaseT) over Category-3 (CAT3) wires and network cards operating at 100 Mbps (i.e., 100BaseT) over Category-5 (CAT5) are in common use in Ethernet local area network (LAN) environments. Additionally, network interface cards that operate at 1 Gbps (i.e., 1000BaseT) are now coming into use in Gigabit Ethernet LANs.

U.S. patent application Ser. Nos. 09/713,389 and 09/713,643, incorporated by reference above, disclose reprogrammable microcontroller architectures for controlling the physical layers of network interface cards. In the microcontrollers disclosed therein, the embedded control program of the internal ROMs can be augmented, patched around, and even replaced by new control program code that is downloaded into internal RAM via a management interface. Although the systems and methods disclosed in application Ser. Nos. 09/713,389 and 09/713,643 are important and useful features for future code updates, debugging and diagnostics, the disclosed systems and apparatuses require an external host personal computer (PC) to control the replacement program downloading operation. In a non-PC environment, such as a router or switch, an alternative mechanism is required to download a replacement program into the multiple interface cards of the router, switch, hub, bridge, or the like.

There is therefore a need in the art for an improved system for upgrading or modifying the embedded control program in a plurality of network interface cards. In particular, there is a need for a reprogramming interface circuit that can simultaneously reprogram a plurality of network interface cards. More particularly, there is a need for a fault-tolerant reprogramming interface circuit that can simultaneously reprogram a plurality of network interface cards even if one or more of the interface cards is malfunctioning.

SUMMARY OF THE INVENTION

To address the above-discussed deficiencies of the prior art, it is a primary object of the present invention to provide, for use in a communication device comprising a plurality of network interface cards for communicating with an external data network, an apparatus for simultaneously transferring a replacement program into a plurality of dedicated memories in the plurality of network interface cards. According to an advantageous embodiment of the present invention, the apparatus comprises: 1) a replacement program memory capable of storing the replacement program; 2) a first microcontroller coupled to the replacement program memory and having a first dedicated memory associated therewith; and 3) a second microcontroller coupled to the replacement program memory and having a second dedicated memory associated therewith. After a power reset has occurred, the first microcontroller monitors a first signal line to the replacement program memory to determine if the second microcontroller is transferring the replacement program from the replacement program memory to the second dedicated memory and wherein the first microcontroller, in response to a determination that the second microcontroller is transferring the replacement program, transfers at least a portion of the replacement program to the first dedicated memory as the replacement program is read from the replacement program memory by the second microcontroller.

According to one embodiment of the present invention, the first microcontroller monitors the first signal line for a first predetermined period of time to determine if the second microcontroller is transferring the replacement program.

According to another embodiment of the present invention, the first microcontroller, at an expiration of the first predetermined period of time and in response to a determination that the second microcontroller is not transferring the replacement program, transfers the replacement program from the replacement program memory to the first dedicated memory.

According to still another embodiment of the present invention, a length of the first predetermined period of time is determined by a fixed address applied by a resistor matrix to address pins of the first microcontroller.

According to yet another embodiment of the present invention, the replacement program memory comprises a serial electronically erasable programmable read only memory (EEPROM).

According to a further embodiment of the present invention, the apparatus as set forth in claim 5 wherein serial EEPROM is coupled to the first and second microcontrollers by a serial data line and a serial clock line.

According to a still further embodiment of the present invention, the serial data line and a serial clock line are used to transfer the replacement program from the replacement program memory to the first and second dedicated memories.

According to a yet further embodiment of the present invention, after a power reset has occurred, the second microcontroller monitors the first signal line to the replacement program memory to determine if the first microcontroller is transferring the replacement program from the replacement program memory to the first dedicated memory and the second microcontroller, in response to a determination that the first microcontroller is transferring the replacement program, transfers at least a portion of the replacement program to the second dedicated memory as the replacement program is read from the replacement program memory by the first microcontroller.

In one embodiment of the present invention, the second microcontroller monitors the first signal line for a second predetermined period of time to determine if the first microcontroller is transferring the replacement program.

In another embodiment of the present invention, the second microcontroller, at an expiration of the second predetermined period of time and in response to a determination that the first microcontroller is not transferring the replacement program, transfers the replacement program from the replacement program memory to the second dedicated memory.

The present invention discloses an inexpensive and fully autonomous mechanism for downloading program code into internal RAM by means of a 2-wire serial EEPROM (electrically erasable PROM) In addition, the present invention addresses the ability to download code into multiple microcontrollers using only a single serial EEPROM. Since the serial EEPROM is write-able as well as read-able, updated code can be uploaded to the serial EEPROM via the management interface of the microcontrollers also.

The present invention permits the simultaneous reprogramming of multiple microcontroller in an non-managed switch (i.e., where no station manager is present to perform this function) or similar data transfer device. The present invention also allows the reprogramming of a microcontroller even when one (or more) of the other microcontrollers in the system are defective and cannot be programmed.

The present invention achieves the following objectives or has the following advantages:

1) Autonomous programming of multiple microcontrollers via a 2-wire interface to a single serial EEPROM.
2) The failure of any microcontroller does not prevent any other microcontroller from being programmed.
3) Any microcontroller can be programmed at any give time, individually or together, after a hardware reset or management power down sequence.
4) No additional hardware other than a single serial EEPROM is required.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged network interface device containing a plurality of microcontroller-based interface cards.

Figure 1:
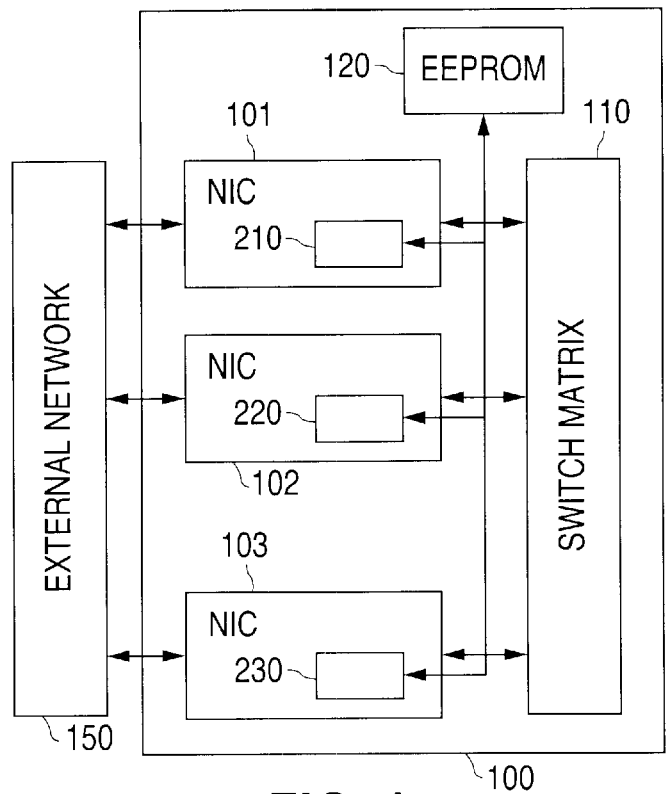
FIG. 1 illustrates an exemplary switch, which communicates with an external data network through a plurality of network interface cards, according to one embodiment of the present invention.

FIG. 1 illustrates selected portions of exemplary switch 100, which communicates with external data network 150 through a plurality of network interface cards according to one embodiment of the present invention. Exemplary switch 100 comprises N network interface cards, including network interface card (NIC) 101, network interface card (NIC) 102, and network interface card (NIC) 103. Switch 100 also comprises switch matrix 110 and electronically erasable programmable read-only memory (EEPROM) 120.

NIC 101 comprises physical layer controller 210, which controls the physical layer operations of NIC 101 with respect to external data network 150. Similarly, NIC 102 comprises physical layer controller 220, which controls the physical layer operations of NIC 102 with respect to external data network 150. Finally, NIC 103 comprises physical layer controller 230, which controls the physical layer operations of NIC 103 with respect to external data network 150.

Each of physical layer controllers 210, 220 and 230 is controlled by an internal microcontroller that is capable of being reprogrammed in order to correct or upgrade the internal embedded ROM control program executed by the internal microcontroller. The internal microcontroller is reprogrammed by downloading a new replacement control program into a RAM associated with the internal microcontroller. The internal microcontroller then executes the downloaded control program in RAM in place of the original embedded control program in ROM. According to the principles of the present invention, EEPROM 120 is used to store the replacement control program that is to be downloaded into the microcontrollers in NIC 101, NIC 102 and NIC 103.

Figure 2:
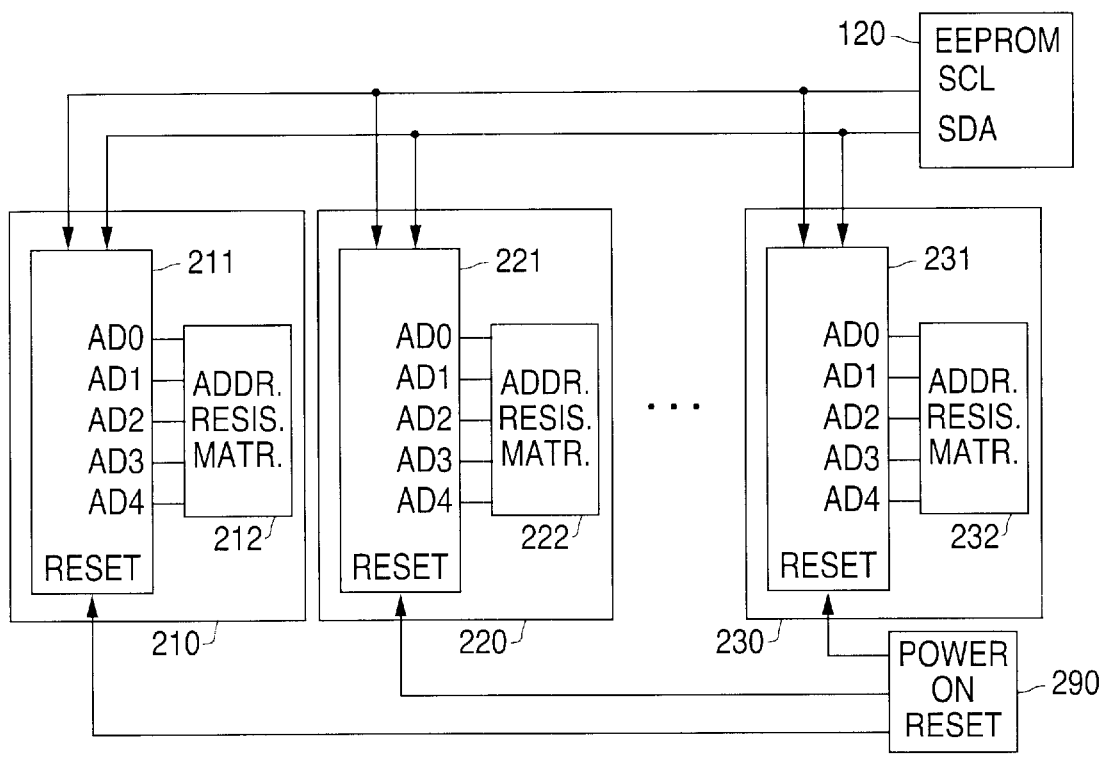
FIG. 2 illustrates an exemplary reprogramming interface circuit capable of simultaneously reprogramming the plurality of network interface cards in the exemplary switch according to one embodiment of the present invention.

FIG. 2 illustrates an exemplary reprogramming interface circuit capable of simultaneously reprogramming the plurality of network interface cards 101–013 in exemplary switch 100 according to one embodiment of the present invention. Selected portions of physical layer controllers 210, 220 and 230 are illustrated. Physical layer controller 210 comprises exemplary microcontroller 211 and address resistor matrix 212. Physical layer controller 220 comprises exemplary microcontroller 221 and address resistor matrix 222. Physical layer controller 230 comprises exemplary microcontroller 231 and address resistor matrix 232. Each of exemplary microcontrollers 211, 221 and 231 are coupled to serial EEPROM 120 by a serial data (SDA) line and a serial clock (SCL) line. Power on reset logic 290 may be used to reset all of microcontrollers 211, 221 and 231 or may be used to reset each of microcontrollers 211, 221 and 231 individually.

In en exemplary embodiment of the present invention, serial EEPROM 120 may be a XICOR X24128, which is a 128 Kbit device internally mapped as 16K×8 bytes. In the illustrated embodiment, only SCL line and the bi-directional SDA line are used to interface to two general purpose (GP) connection pins on microcontrollers 211, 221 and 231. Since a XICOR X24128 meets the industry standard for an EEPROM with a 2-signal interface, similar EEPROM chips from other manufacturers may also be used, as well.

The following generally describes how multiple microcontrollers can be re-programmed, either individually or together. The specifics of how this is done are discussed below in greater detail.

Programming Microcontrollers Together

In order for the serial EEPROM 120 programming algorithm to function effectively, each one of microcontrollers 211, 221 and 231, must be hardwired to a different microcontroller address. When all of microcontrollers 211, 221 and 231 are powered up (i.e., reset) together, a short delay period occurs, after which the microcontroller with the lowest microcontroller address asserts the role of server. Each of the other microcontrollers detect this assertion and assumes the role of a client. The server microcontroller then actively clocks serial data out of serial EEPROM 120 and the client microcontrollers are programmed to stay in synchronization with the server-driven clock. Thus, both the server microcontroller and the client microcontrollers simultaneously read the serial data being clocked out serial EEPROM 120.

As each byte of the replacement program code is serially read from serial EEPROM 120, both the server microcontroller and the client microcontrollers store the byte into internal RAM. When all of the replacement program code is read from serial EEPROM 120 each microcontroller performs a checksum computation on the code in its internal RAM. If the checksum calculation matches the downloaded checksum, a program jump is made to the replacement code in internal RAM. Otherwise, the embedded control program in each microcontroller continues to be executed from internal ROM.

Programming Microcontrollers Individually

If one or more of microcontrollers 211, 221 and 231 are independently reset by power on reset 290, either by direct management intervention or because of some other circumstance, each of the microcontroller(s) in question tests the condition of the serial clock and data lines of serial EEPROM 120 to determine if it can immediately assume the role of server. If no other microcontrollers are acting as the server (i.e., controlling the SCL line), the microcontroller in question asserts itself as the server and downloads the replacement control program code from serial EEPROM 120 into its internal RAM. However, if another microcontroller is currently acting as the server, the microcontroller in question simply times out or delays for approximately 1,600 milliseconds and then tries again. At some point all of the other microcontrollers will download the replacement control program code from serial EEPROM 120 and the microcontroller in question then gets to do the same.

Once again, when all code is read from serial EEPROM 120 into internal RAM, the microcontroller performs a checksum computation on the downloaded replacement control program code. If the checksum calculation matches the downloaded checksum, a program jump is made to the replacement control program code in internal RAM. Otherwise, the embedded original control program continues to be executed from internal ROM.

Figure 3:
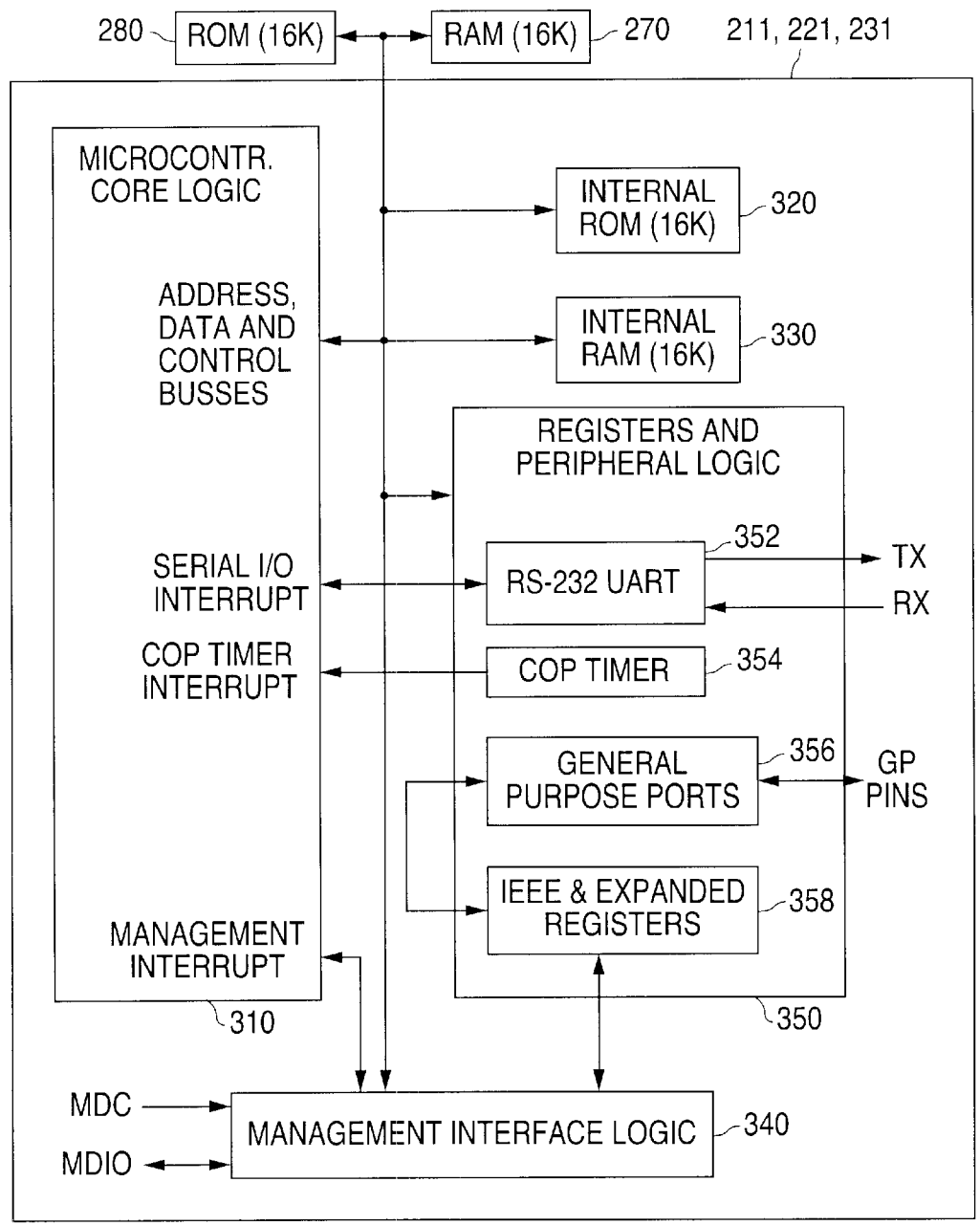
FIG. 3 illustrates an exemplary microcontroller in the physical layer controller of the network interface card according to one embodiment of the present invention.

FIG. 3 illustrates exemplary microcontroller 211 (or 221 or 231) in greater detail according to one embodiment of the present invention. Microcontroller 211 comprises microcontroller core logic 310, internal read-only memory (ROM) 320, internal random access memory (RAM) 330, management interface logic 340, registers and peripheral logic 350, optional external ROM 260, and optional external RAM 270. Registers and peripheral logic 350 comprises RS-232 UART 352, computer operating properly (COP) timer 354, general purpose ports 356, and IEEE and expanded registers 358. Microcontroller core logic 310 is coupled to ROM 320, RAM 330, ROM 260, RAM 270, and registers and peripheral logic 350 by address, data and control busses. Microcontroller core logic 310 also receives interrupt signals from management interface logic 340 and registers and peripheral logic 350.

In an exemplary embodiment of the present invention, microcontroller 211 may comprise a variation of a standard Motorola™ MC68HC11 microcontroller. However, those skilled in the art will understand that equivalent microcontrollers from other manufacturers may readily be adopted for use in accordance with the principles of the present invention. Furthermore, in the exemplary embodiment, ROM 320 and RAM 330 are each 16 kilobytes (16K) in size and are internal to microcontroller 211. However, this is by way of illustration only. In alternate embodiments, additional ROM 260 and RAM 270 may be external devices coupled to microcontroller 211 and the size of ROM 320, ROM 260, RAM 330, or RAM 270 also may be smaller or larger than 16 kilobytes.

In an exemplary embodiment, microcontroller core logic 310 comprises a high performance, synthesizable 8-bit CPU core. Microcontroller core logic 310 may implement, for example, the complete Motorola MC68HC11 instruction set and hardware architecture, including a sequencer, instruction decode unit, arithmetic unit and registers, as well as other support logic. Microcontroller core logic 310 may include an interrupt priority resolution system. In an exemplary embodiment, microcontroller 211 is driven by a 41.667 MHz clock signal.

In normal operating modes, microcontroller 211 uses an internal embedded program (i.e., firmware) in ROM 320 to control 10Base-T, 100Base-T and 1000Base-T physical layer functions, as well as RS-232 and management communications between switch 100 and external data network 150. The ROM 320 firmware may perform the following major functions:

- Power-On Initialization
- Start Up Configuration
- Main Loop Control
- Test Mode Control
- Loopback Control
- Auto Negotiation
- 10/100/1000 Base PHY-Control
- 1000 Base Link Monitor
- RS-232 Serial Communications
- Management Communications
- LED Illumination Control
- Patch Routines Normally, program variables, pointers, multitasking vectors and the stack reside in the 16 Kbytes of RAM 320. According to the principles of the present invention, patches, upgrades and enhancements to the software control program may be downloaded as software (as opposed to firmware) that is stored in RAM 320 through general purpose ports 356. The downloaded software code also permits the user to conduct extensive testing and debugging using the register interface of microcontroller 211.

RS-232 UART 352 forms a serial I/O (SIO) hardware interface between microcontroller 211 and the other portion of switch 100. RS-232 UART 352 logic has two functional interfaces: a 2-wire link (RX and TX) to switch 100 and a 4 byte-wide data paths to microcontroller core logic 310. The TX and RX signals form a conventional RS-232 asynchronous communication link. Serial data can be transferred to and from switch 100 in full-duplex mode at one of four standard baud rates (115,200, 57,600, 38,400 and 19,200). Each serial data word is composed of a start bit, 8 data bits and one stop bit. Since this is a universally accepted asynchronous serial data format, it ensures that any terminal program resident on switch 100 can transmit and receive serial data to and from RS-232 UART 352 at the standard baud rates.

Computer operating properly (COP) timer 354 has two basic functions: 1) to issue an interrupt if, and when, it is not properly serviced by firmware; and 2) to act as a general-purpose event timer for any firmware or software routine. At the core of COP timer 354 is a 26-bit free-running binary up counter that is incremented on each positive-going edge of the 41.67 MHz microcontroller clock. At a clock rate of 41.67 MHz, 26 bits are necessary due to the fact that microcontroller 211 may time events over 1.5 seconds.

The primary function of COP timer 354 is to indirectly detect software errors by timing out. Therefore, if the firmware and/or software are functioning correctly, COP timer 354 is periodically reset thus keeping it from timing out. Resetting COP timer 354 is accomplished by writing a Logic 1 to bit 0 of a COP control register. The Logic 1 write to this register is self clearing and COP timer 354 resumes counting from zero on the next positive-going edge of the 41.67 MHz microcontroller clock.

If COP timer 354 does time out, it is an indication that the firmware or software is no longer being executed in the intended manner. If a time-out occurs, COP timer 354 issues a non-maskable interrupt to microcontroller core logic 310 that resets the microcontroller firmware code back to a power-on reset condition. In addition to its primary watch-dog function, COP timer 354 may also be used as a general-purpose event timer. Since COP timer 354 is 26 bits in length and increments on each positive-going edge of the 41.67 MHz clock, microcontroller 211 can time events as long as 1.6 seconds.

IEEE and expanded registers 358 allow switch 100 to access the internal workings of microcontroller 211. In an exemplary embodiment, IEEE and expanded registers 358 are organized as 256 register files (RF0 through RF255) with each register file consisting of 64 bytes. Although all 256 register files may not used, unused registers allow future functions to be added to the operation of microcontroller 211. Most individual registers exist in internal RAM with the exception of certain hardware-based registers normally located in RF0 through RF3.

Management interface logic 340 communicates with EEPROM 120 using two of general purpose ports 356 that are connected to the SCL line and the SDA line. After a reset event (e.g., power ON) occurs, microcontroller 211 monitors the SCL line and the SDA line during a predetermined time period to determine if another microcontroller acts as a server. If not, microcontroller 211 will act as a server at the end of the predetermined time period. The predetermined time periods for microcontrollers 211, 221 and 231 are determined by the address values set by address resistor matrices 212, 222 and 232, respectively.

Figure 4:
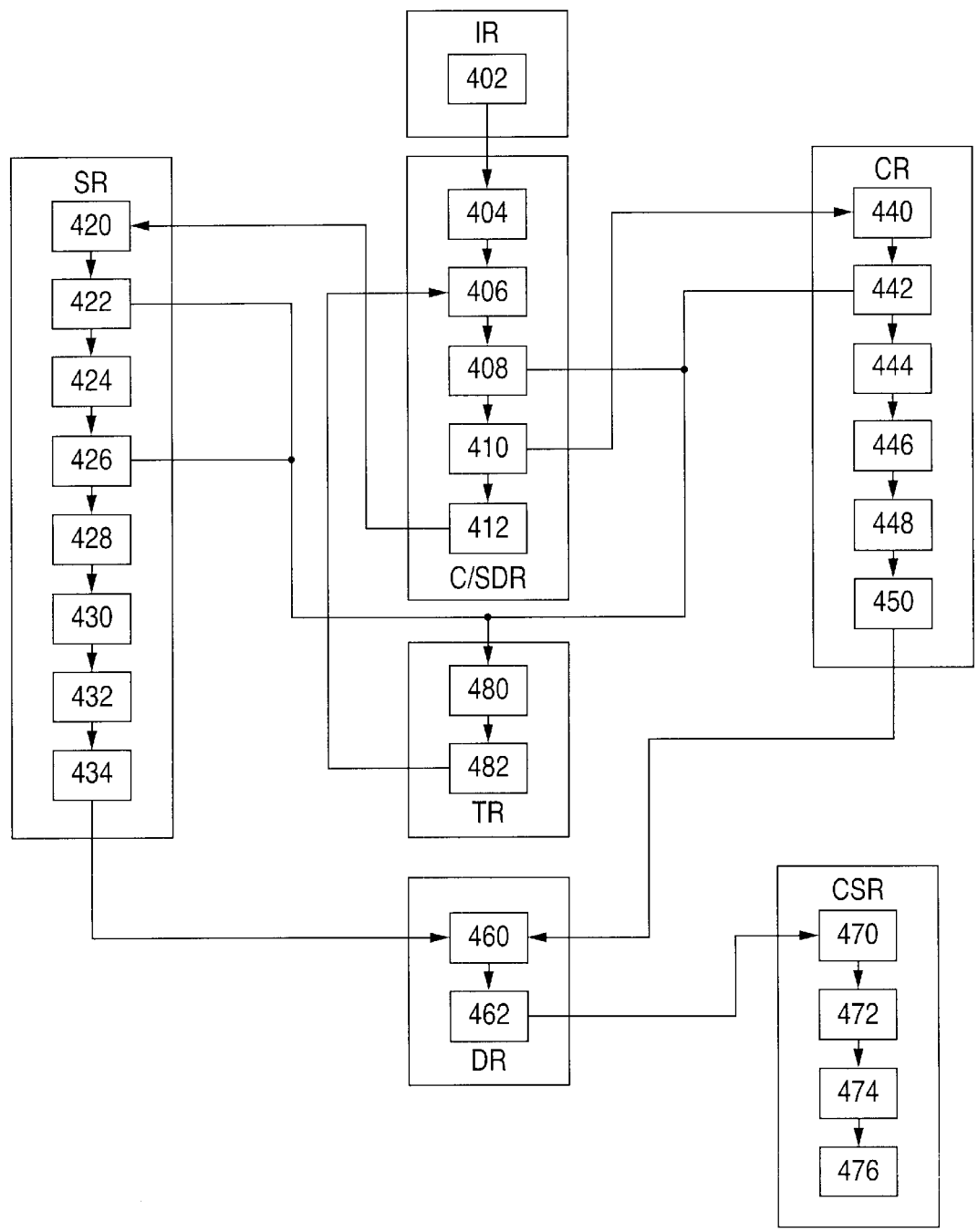
FIG. 4 is a flowchart illustrating the operation of the embedded control program in the exemplary microcontroller according to one embodiment of the present invention.

Immediately after reset, each one of microcontrollers 211, 221 and 231 determines the role it must play (i.e., server or client) in downloading the replacement control program code from serial EEPROM 120. FIG. 4 depicts flowchart 400, which illustrates the operation of the embedded control program in microcontroller 211 (or 221 or 231) according to one embodiment of the present invention:

| | Initialization Routine (IR) |
|---|---|
| Step 402: | Microcontroller 211 determines the microcontroller address and initializes the internal RAM pointer. |
| | Client/Server Determination Routine (C/SDR) |
| Step 404: | Microcontroller 211 enters a delay period, the length of which is based on the microcontroller address value (delay = microcontroller address × 6.3 msec.). |
| Step 406: | During delay period, microcontroller 211 monitors both the SDA and SCL lines for activity. |
| Step 408: | If the SCL line toggles (changes state), microcontroller 211 jumps to the Timeout Routine (i.e., microcontroller 211 is out of sync with the server). |
| Step 410: | If the SDA line goes low, microcontroller 211 jumps to the Client Routine immediately (i.e., another microcontroller with a lower microcontroller address has assumed the role of server). |
| Step 412: | When the delay period is complete, microcontroller 211 jumps to the Server Routine. |
| | Server Routine (SR) |
| Step 420: | Microcontroller 211 immediately sets the SDA line low (Logic 0). This signals to the other microcontrollers that microcontroller 211 is acting as server. |

-continued

| Step 422: | Microcontroller 211 delays for 12.6 milliseconds, holding SDA low. While delaying, microcontroller 211 also monitors the SCL line. If the SCL line toggles (changes state), microcontroller 211 jumps to the Timeout Routine (i.e., another microcontroller is the server). |
|---|---|
| Step 424: | Microcontroller 211 release the SDA line to its normal high state (Logic 1) and immediately reads the SDA line. |
| Step 426: | If the SDA line is still held low, microcontroller 211 jump to the Timeout Routine (i.e., another microcontroller is the server). |
| Step 428: | If the SDA line is not still held low, microcontroller 211 is determined to be the server. |
| Step 430: | Microcontroller 211 addresses serial EEPROM 120 to determine if serial EEPROM 120 responds with the proper acknowledge signal. |
| Step 432: | If serial EEPROM 120 does NOT acknowledge the address interrogation, microcontroller 211 continues running code in internal ROM (i.e., serial EEPROM 120 is not present). |
| Step 434: | If serial EEPROM 120 does acknowledge the address interrogation, microcontroller 211 jumps to the Download Routine. |

Client Routine (CR)

| Step 440: | Microcontroller 211 tests for SDA staying low (Logic 0) and SCL not toggling for 6.3 milliseconds. |
|---|---|
| Step 442: | If SDA goes high (Logic 1) or SCL toggles, then microcontroller 211 jumps to the Timeout Routine (i.e., microcontroller 211 is out of sync with the server). |
| Step 444: | Microcontroller 211 get in synchronization with the server by closely monitoring the SDA line. |
| Step 446: | When SDA goes high (Logic 1), microcontroller 211 monitors the server's attempt to address serial EEPROM 120 to determine if it responds with the proper acknowledge signal. |
| Step 448: | If serial EEPROM 120 does NOT acknowledge the server's address interrogation, microcontroller 211 continues running code in internal ROM (i.e., serial EEPROM 120 is not present). |
| Step 450: | Microcontroller 211 jumps to the Download Routine. |

Download Routine (DR)

| Step 460: | If microcontroller 211 is the server, microcontroller 211 serially clocks out each bit of data from serial EEPROM 120 and |
|---|---|
| | a) Organizes the bits into a byte; |
| | b) Stores the byte to internal RAM; |
| | c) Increments the RAM pointer; |
| | d) Tests for end of code transfer (address 0xBF00); |
| | e) If code transfer is complete, microcontroller 211 jumps to the Checksum Routine; and |
| | f) If the code transfer is not complete, microcontroller 211 continues transferring code. |
| Step 462: | If microcontroller 211 is a client, microcontroller 211 monitors the server as it clocks each bit from serial EEPROM 120 and |
| | a) Organizes the bits into a byte; |
| | b) Stores the byte to internal RAM, |
| | c) Increments the RAM pointer; |
| | d) Tests for end of code transfer (address 0xBF00); |
| | e) If code transfer is complete, microcontroller 211 jumps to the Checksum Routine; and |
| | f) If the code transfer is not complete, microcontroller 211 continues transferring code. |

CheckSum Routine (CSR)

| Step 470: | Microcontroller 211 computes a checksum on all downloaded code in internal RAM. |
|---|---|
| Step 472: | Microcontroller 211 compares the computed checksum against the last downloaded byte, which is the master checksum put into serial EEPROM 120 when it was programmed. |
| Step 474: | If the computed checksum matches the master checksum, then microcontroller 211 jumps to the downloaded code in internal RAM. |
| Step 476: | If the computed checksum does NOT match the master checksum, then microcontroller 211 continues to run the control program code in internal ROM. |

-continued

Timeout Routine (TR)

| Step 480: | Microcontroller 211 delays 1,600 milliseconds. |
|---|---|
| Step 482: | Microcontroller 211 jumps to Step 406 in Client/Server Determination Routine. |

Although the present invention has been described in detail, those skilled in the art should understand that they can make various changes, substitutions and alterations herein without departing from the spirit and scope of the invention in its broadest form.

What is claimed is:

1. For use in a communication device comprising a plurality of network interface cards for communicating with an external data network, an apparatus for simultaneously transferring a replacement program into a plurality of dedicated memories in said plurality of network interface cards, said apparatus comprising:

a replacement program memory capable of storing said replacement program;

a first microcontroller coupled to said replacement program memory and having a first dedicated memory associated therewith;

a second microcontroller coupled to said replacement program memory and having a second dedicated memory associated therewith, wherein, after a power reset has occurred, said first microcontroller monitors a first signal line to said replacement program memory to determine if said second microcontroller is transferring said replacement program from said replacement program memory to said second dedicated memory and wherein said first microcontroller, in response to a determination that said second microcontroller is transferring said replacement program, transfers at least a portion of said replacement program to said first dedicated memory as said replacement program is read from said replacement program memory by said second microcontroller.

2. The apparatus as set forth in claim 1 wherein said first microcontroller monitors said first signal line for a first predetermined period of time to determine if said second microcontroller is transferring said replacement program.

3. The apparatus as set forth in claim 2 wherein said first microcontroller, at an expiration of said first predetermined period of time and in response to a determination that said second microcontroller is not transferring said replacement program, transfers said replacement program from said replacement program memory to said first dedicated memory.

4. The apparatus as set forth in claim 3 wherein a length of said first predetermined period of time is determined by a fixed address applied by a resistor matrix to address pins of said first microcontroller.

5. The apparatus as set forth in claim 4 wherein said replacement program memory comprises a serial electronically erasable programmable read only memory (EEPROM).

6. The apparatus as set forth in claim 5 wherein serial EEPROM is coupled to said first and second microcontrollers by a serial data line and a serial clock line.

7. The apparatus as set forth in claim 6 wherein said serial data line and a serial clock line are used to transfer said replacement program from said replacement program memory to said first and second dedicated memories.

8. The apparatus as set forth in claim 1 wherein, after a power reset has occurred, said second microcontroller monitors said first signal line to said replacement program memory to determine if said first microcontroller is transferring said replacement program from said replacement program memory to said first dedicated memory and wherein said second microcontroller, in response to a determination that said first microcontroller is transferring said replacement program, transfers at least a portion of said replacement program to said second dedicated memory as said replacement program is read from said replacement program memory by said first microcontroller.

9. The apparatus as set forth in claim 8 wherein said second microcontroller monitors said first signal line for a second predetermined period of time to determine if said first microcontroller is transferring said replacement program.

10. The apparatus as set forth in claim 9 wherein said second microcontroller, at an expiration of said second predetermined period of time and in response to a determination that said first microcontroller is not transferring said replacement program, transfers said replacement program from said replacement program memory to said second dedicated memory.

11. A switch capable of communicating with a data network comprising:

- a plurality of network interface cards, each of said plurality of network interface cards having an external interface for communicating with said external data network;
- a switch matrix coupled to an internal interface of each of said plurality of interface cards and capable of transmitting data therebetween;
- an apparatus for simultaneously transferring a replacement program into a plurality of dedicated memories in said plurality of network interface cards, said apparatus comprising:
  - a replacement program memory capable of storing said replacement program;
  - a first microcontroller coupled to said replacement program memory and having a first dedicated memory associated therewith;
  - a second microcontroller coupled to said replacement program memory and having a second dedicated memory associated therewith, wherein, after a power reset has occurred, said first microcontroller monitors a first signal line to said replacement program memory to determine if said second microcontroller is transferring said replacement program from said replacement program memory to said second dedicated memory and wherein said first microcontroller, in response to a determination that said second microcontroller is transferring said replacement program, transfers at least a portion of said replacement program to said first dedicated memory as said replacement program is read from said replacement program memory by said second microcontroller.

12. The switch as set forth in claim 11 wherein said first microcontroller monitors said first signal line for a first predetermined period of time to determine if said second microcontroller is transferring said replacement program.

13. The switch as set forth in claim 12 wherein said first microcontroller, at an expiration of said first predetermined period of time and in response to a determination that said second microcontroller is not transferring said replacement program, transfers said replacement program from said replacement program memory to said first dedicated memory.

14. The switch as set forth in claim 13 wherein a length of said first predetermined period of time is determined by a fixed address applied by a resistor matrix to address pins of said first microcontroller.

15. The switch as set forth in claim 14 wherein said replacement program memory comprises a serial electronically erasable programmable read only memory (EEPROM).

16. The switch as set forth in claim 15 wherein serial EEPROM is coupled to said first and second microcontrollers by a serial data line and a serial clock line.

17. The switch as set forth in claim 16 wherein said serial data line and a serial clock line are used to transfer said replacement program from said replacement program memory to said first and second dedicated memories.

18. The switch as set forth in claim 11 wherein, after a power reset has occurred, said second microcontroller monitors said first signal line to said replacement program memory to determine if said first microcontroller is transferring said replacement program from said replacement program memory to said first dedicated memory and wherein said second microcontroller, in response to a determination that said first microcontroller is transferring said replacement program, transfers at least a portion of said replacement program to said second dedicated memory as said replacement program is read from said replacement program memory by said first microcontroller.

19. The switch as set forth in claim 18 wherein said second microcontroller monitors said first signal line for a second predetermined period of time to determine if said first microcontroller is transferring said replacement program.

20. The switch as set forth in claim 19 wherein said second microcontroller, at an expiration of said second predetermined period of time and in response to a determination that said first microcontroller is not transferring said replacement program, transfers said replacement program from said replacement program memory to said second dedicated memory.

* * * * *

UNITED STATES PATENT AND TRADEMARK OFFICE
CERTIFICATE OF CORRECTION

PATENT NO. : 6,745,325 B1
DATED : June 1, 2004
INVENTOR(S) : John E. Gavlik

It is certified that error appears in the above-identified patent and that said Letters Patent is hereby corrected as shown below:

Title page,
Item [57], ABSTRACT,
Lines 1, 2 and 3, delete "There is disclosed, for use in a communication device comprising a plurality of network interface cards for communicating with an external data network, an";
Line 3, insert -- An -- before "apparatus";
Line 4, delete "simultaneously";
Lines 5 and 6, delete "in the plurality of network interface cards. The apparatus comprises." and replace with -- includes: --;
Line 17, insert -- . -- after "memory";
Line 17, delete "and wherein the" and insert -- The --;

Column 5,
Line 17, delete "013" and replace with -- 103 --.

Signed and Sealed this

Twenty-fifth Day of April, 2006

JON W. DUDAS
*Director of the United States Patent and Trademark Office*